N. B. WALES.
AIR COMPRESSION POWER PLANT.
APPLICATION FILED AUG. 1, 1918. RENEWED JUNE 8, 1920.

Patented Sept. 14, 1920.
9 SHEETS—SHEET 1.

N. B. WALES.
AIR COMPRESSION POWER PLANT.
APPLICATION FILED AUG. 1, 1918. RENEWED JUNE 8, 1920.

1,353,100.

Patented Sept. 14, 1920.
9 SHEETS—SHEET 7.

Inventor
N. B. Wales
By his Attorneys
Rogers, Kennedy & Campbell

UNITED STATES PATENT OFFICE.

NATHANIEL B. WALES, OF DETROIT, MICHIGAN, ASSIGNOR TO WALES MOTORS CORPORATION, A CORPORATION OF DELAWARE.

AIR-COMPRESSION POWER PLANT.

1,353,100.  Specification of Letters Patent.  Patented Sept. 14, 1920.

Application filed August 1, 1918, Serial No. 247,725. Renewed June 8, 1920. Serial No. 387,510.

*To all whom it may concern:*

Be it known that I, NATHANIEL B. WALES, a citizen of the United States, residing at Detroit, in the county of Wayne and State of Michigan, have invented certain new and useful Improvements in Air-Compression Power Plants, of which the following is a specification, reference being had therein to the accompanying drawing.

This invention relates to that type of air compression power plants or mechanisms in which the power is primarily produced by an internal combustion engine, the chief object of the invention being to directly utilize the high mean effective pressures realized in the Diesel type of internal combustion engine, without the employment of connecting rods, crank shafts, fly wheels and the like, commonly used to give uniform motion to the parts. Another object of the invention is to produce an air compression power plant or mechanism which will be compact in form, may be run at very high speeds, will develop the maximum power at the minimum of expense, and the weight of which will be at a minimum in proportion to its displacement.

With these and other objects in view my invention consists primarily in combining an internal combustion engine of the Diesel type, with an air compressor, and in so constructing and arranging the parts that the high initial compression in the power cylinder of the engine, and the pressure developed by the air compressor are utilized as a cushioning means to control the movements of the reciprocating masses, thereby avoiding sudden or violent shocks, and producing smooth and uniform action without the employment of cranks, connecting rods, fly wheels and the like. As a result of this construction and arrangement of the parts, the power developed by the Diesel engine is not applied directly to the work ultimately to be performed, but is applied to compress air, which may be employed in various ways and by various means to perform work, for instance to operate an air expansion engine for the propulsion of automobiles.

Also in accordance with my invention air under comparatively low pressure from the air compression cylinders is admitted to the power cylinders at the moment of exhaust, and acts to scavenge said cylinders and clear the same of the burnt products of combustion, the said low pressure of air being admitted also to the fuel injection mechanism to initiate the feed of the fuel to the power cylinders. Also in accordance with my invention the air compressed at high pressure in the air compression cylinders is passed through a heating coil heated by the exhaust from the power cylinders, and the heated air may be supplied to an air expansion engine when such is employed, to operate said engine economically and under the most favorable conditions for the generation of the maximum of power.

My invention consists also in an improved method of automatically and predeterminately limiting the pressure of the air compressed in an air compressor without stalling or stopping the mechanism.

My invention contemplates also various improved features of the structural formation and arrangements of the parts of the organization as a whole, which improved features will be particularly described in the specification to follow and the novel parts of which will be set forth in the appended claims.

Referring to the drawings:

Referring particularly to Figs. 1 to 4, the operative parts of my improved mechanism are mounted in and sustained by a casing or frame 1 formed at its upper end with two air compression cylinders 2 and 3 disposed side by side in fixed relations and formed at its lower end with two similar cylinders 4 and 5 disposed in like arrangement in axial alinement with the upper cylinders. Between these cylinders the casing is formed with two power cylinders 6 and 7 of relatively smaller diameter than the others, with the power cylinder 6 extending in axial alinement with the upper and lower air cylinders 2 and 4, and communicating at its opposite ends therewith, and the power cylinder 7 extending in axial alinement with the upper and lower cylinders 3 and 5, and communicating at its opposite ends with said cylinders. These two sets of cylinders are all connected together in fixed relations in a unitary structure or bloc, a free space being left in the same between the power cylinders, in which space the fuel injection mechanism 8—8, to be more particularly described hereinafter, are located. The air cylinders are open at their inner ends and surround the open outer ends of the alined power cylinders which extend at their outer ends some distance into the inner open ends of the air cylinders, annular spaces open at their inner ends being thus left between the outer ends of the power cylinders and inner ends of the air cylinders.

Reciprocating in the air compression cylinder 2 is an air compression piston 9 having connected with it by means of a stem 9$^a$, a power piston 10 which extends into and slides in the upper end of the power cylinder 6; and reciprocating in the air compression cylinder 4 is an air compression piston 11 which has connected with it by means of a stem 11$^a$, a power piston 12 which extends into and slides in the lower end of said power cylinder, 6, the arrangement being such that the power pistons may move toward each other forming a clearance volume chamber A in which is produced a cushioning pressure, the temperature of which is sufficient to ignite the injected fuel, and may move away from each other under the expansive power of the burning fuel to compress the air in the air cylinders. The two power pistons and their connected air pistons constitute in effect two opposed piston structures, each consisting of a power piston and an alined connected air piston.

Similarly reciprocating in the air cylinder 3 is an air compression piston 13 having connected with it by means of a connecting stem 13$^a$, a power piston 14 which extends into and slides in the upper end of the power cylinder 7; and reciprocating in the air compression cylinder 5 is an air compression piston 15 having connected with it by means of a connecting stem 15$^a$, a power piston 16 which extends into and reciprocates in the lower end of the said power cylinder 7, these opposing pistons being movable to and from each other similar to the pistons of the other set, and performing like functions, and constituting in effect two opposed piston structures similar to those of the other set. The injected fuel enters the power cylinders respectively between the power pistons of the two sets through fuel ports 17 and 18 extending through the walls of the power cylinders as will be hereinafter more particularly described.

The opposing power pistons of each set are connected together for relative movement and one set of pistons is connected with the other for relative movement and in such manner that the pistons will be coordinated in their movements, the opposing pistons of one set moving to and from each other, and the opposing pistons of the other set moving simultaneously in like manner but in opposite directions to the pistons of the first set. In other words, when the power pistons 10 and 12 and their connected air pistons move outwardly from each other under the effects of the burning fuel, the power pistons 14 and 16 will move inwardly toward each other to produce the pressure to ignite the fuel on that side, and when the power pistons 14 and 16 move outwardly, the other power pistons 10 and 12 will move inwardly, the air pistons in these operations compressing the air, first in the air cylinders 2 and 4, and then in the air cylinders 3 and 5 in the successive cycles of the engine.

This connection and synchronizing of the movements of the pistons is in the present instance effected by means of two pairs of rocker plates 19 and 20, the rocker plates 19 being mounted to rock on the horizontal studs 21 projecting outwardly from the outer side of the cylinder 6, and the rocker plates 20 being similarly mounted to rock on horizontal studs 22 projecting outwardly from the outer side of the power cylinder 7. These rocker plates are rectangular in form, the plates 19 being connected with the opposing pistons of its set by means of a pair of upper links 23 and a pair of lower links 24. The links of the upper pair are journaled at their inner ends on horizontal studs 25 projecting inwardly from the respective rocker plates 19, and at their outer ends the links extend into the annular space between the power and air cylinders and are journaled on horizontal studs 26 projecting outwardly from the stem 9ª which connects the air piston 9 with the power piston 10. The links 24 of the lower pair are journaled at their inner ends on alined studs 27 projecting inwardly from said rocker plates on the side of their axes opposite the studs 25, and extend at their outer ends into the annular space between the power and air cylinders and are journaled at said ends on horizontal studs 28 projecting outwardly from the stem 13ª which connects the power piston 12 with the air piston 11. By this means, the opposing pistons of one set are tied or connected together by a linkage comprising the upper and lower pairs of links and the common connected rocking plates, the result being that when the pistons move outwardly away from each other, the plates will be rocked in one direction, and when the pistons move inwardly toward each other the plates will be rocked in the opposite direction.

The opposing pistons of the other set are connected together in a similar manner by means of upper and lower pairs of links 29 and 30 journaled at their inner ends on studs 31 and 32 projecting inwardly from the rocking plates 20 on opposite sides of the axes of said plates, and journaled at their outer ends on studs 33 and 34 projecting outwardly from the stems 13ª and 15ª which connect the air pistons 3 and 5 with the power pistons 14 and 16.

The connections so far described tie or link the opposing pistons of each pair together, the movements of the opposing pistons to and from each other causing the connected rocking plate to rock in opposite directions. In order, however, that the movement of the opposing pistons of one set will be synchronized with the movement of the opposing pistons of the other set, the two pairs of rocking plates 19 and 20 are connected together as shown more particularly in Figs. 1 and 3. Here it will be seen that the rocking plates 19 and 20 are connected together on opposite sides of the casing of the engine by means of upper horizontal links 35 and lower horizontal links 36. The upper links are journaled at one end on horizontal studs 37 projecting outwardly from the plates 19, and at their opposite ends they are journaled on horizontal studs 38 projecting outwardly from the rocker plates 20, while the lower links are journaled at one end on horizontal studs 39 projecting outwardly from the rocker plates 19, and are journaled at their opposite ends on horizontal studs 40 projecting outwardly from the rocker plates 20, the studs 37 and 39 being on opposite sides of the axes of the plates 19, and the studs 38 and 40 being on opposite sides of the axes of the plates 20. This connection of the rocker plates on each side constitutes a parallel link motion which causes the plates on each side to rock in unison and in synchronism with each other in the same direction, and in order that the movements of the plates and links on the opposite sides will be equalized and uniform and free from twisting or binding strains, the upper links on opposite sides are connected together, and likewise the lower links on opposite sides are connected together, and also the connected upper and lower links on one side are connected with the connected upper and lower links on the other side. This is accomplished by means of a horizontal transverse rock shaft 41 (see Fig. 3) which is journaled in bearings in brackets 42 projecting outwardly from the housing of the engine. This shaft has rocker arms 43—43 fixed to its opposite ends, which arms extend on opposite sides of the axis of the shaft. The upper ends of the rocker arms are provided with inwardly extending studs 44 on which are journaled the outer ends of links 45, whose inner ends are journaled on the studs 38. The lower ends of the rocker arms are provided with inwardly extending studs 46 on which are journaled the outer ends of links 47 whose inner ends are journaled on the studs 40. Due to the arrangement and form of the linkage on opposite sides and their connections, when the power and air pistons of one set move outwardly from each other, those of the other set will move in the opposite direction inwardly toward each other and vice versa, the sets of rocking plates 19 and 20 moving in the same directions, and the said movements being in perfect coördination and synchronism and free from unequal stress or strains.

The effect of the connection of the two sets of pistons in the manner described is to cause them to operate with a floating action in their respective cylinders, there being no means to restrain them in their movements, hence the pistons may operate with a variable stroke according to the variation in speed and fuel injection per stroke. Due to this fact, and the alternate action of the pistons of the two sets, one set will balance the movements of the other set and the parts will operate with great smoothness and uniformity under the most favorable conditions for the maximum power and efficiency for the amount of fuel used, and this without the employment of fly wheels or similar means universally used in connection with the Diesel type of internal combustion engine. The areas of the power pistons are preferably so proportioned with relation to the areas of the air compressing pistons, that the respective masses throughout the structure are directly and equally cushioned with respect to the termination of their strokes, thereby relieving to a maximum the stress peaks occurring in the linkage.

The various ports in the power cylinders and air compression cylinders will now be described, and as these ports are the same for all the cylinders, a description of the ports of one set will suffice.

Figure 1:
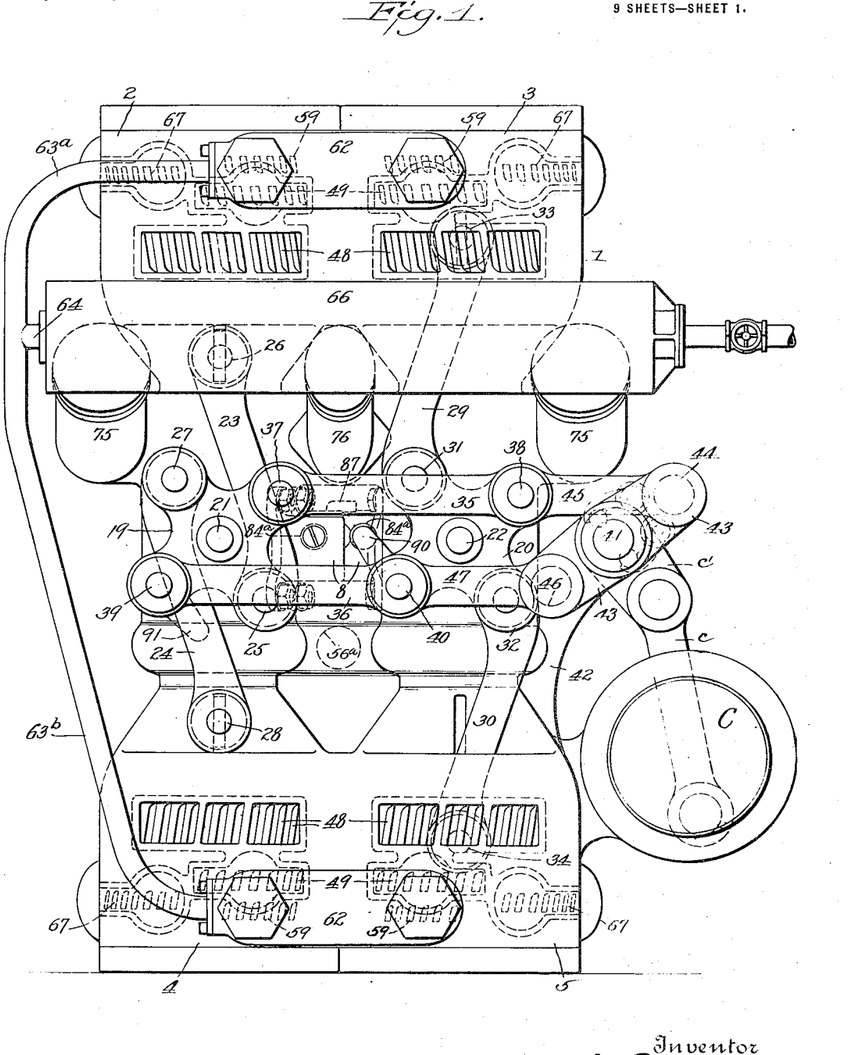
Figure 1 is a side elevation of an air compressor and internal combustion engine operating the same, said parts being constructed in accordance with my invention.
Figure 2:
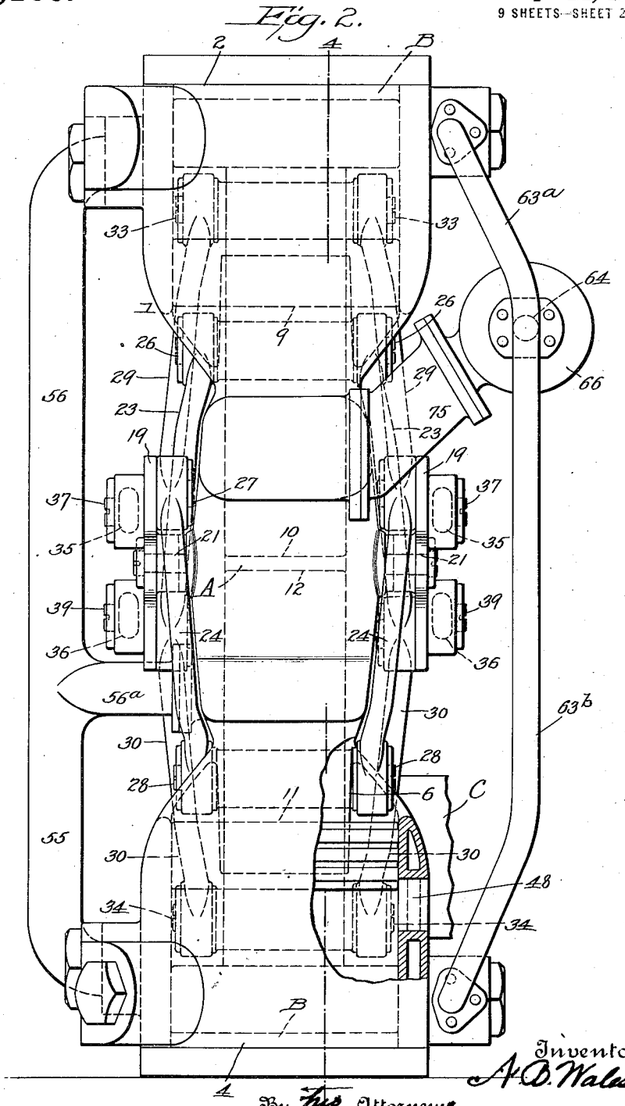
Fig. 2 is an end elevation of the same as viewed from the left of Fig. 1.
Figure 3:
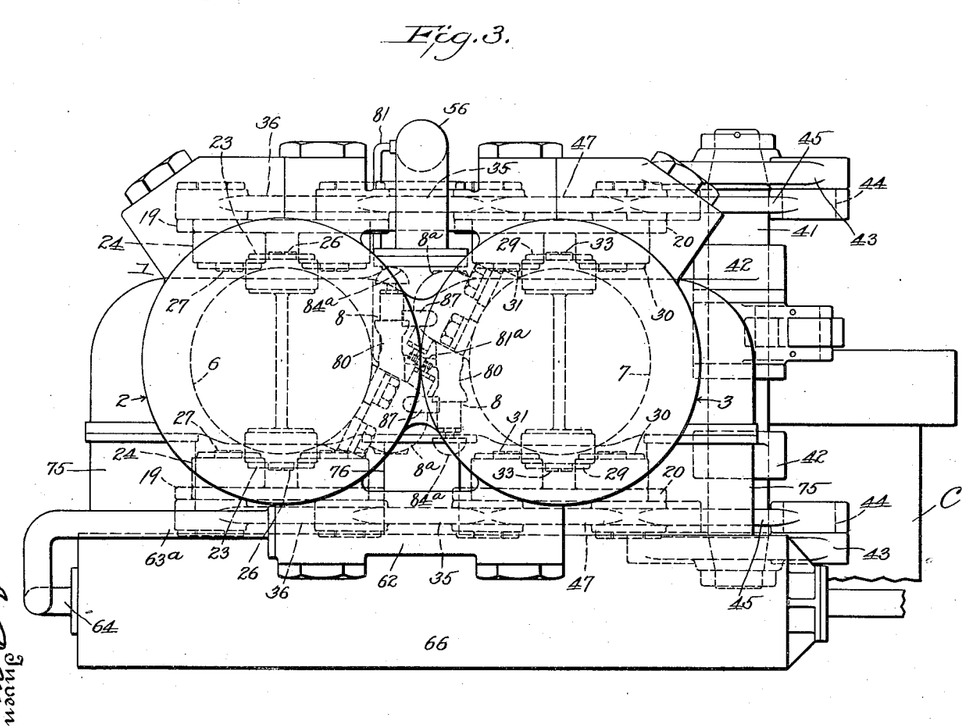
Fig. 3 is a top plan view of the same.
Figure 4:
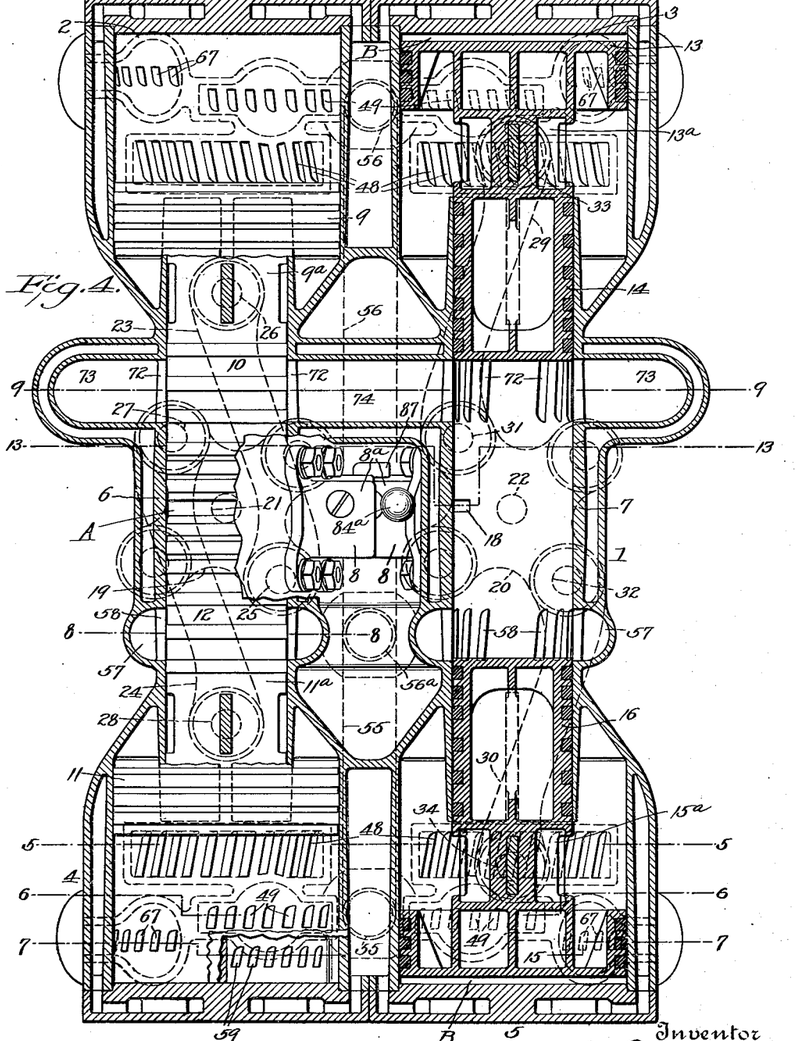
Fig. 4 is a vertical sectional elevation through the apparatus.
Figure 5:
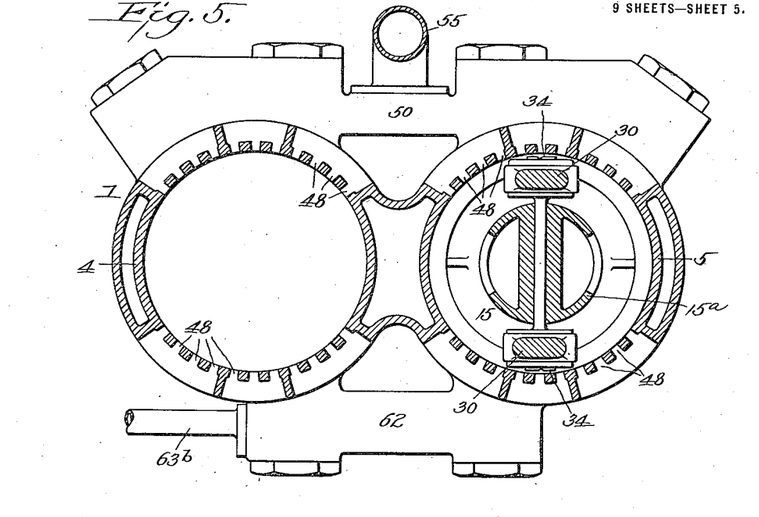
Fig. 5 is a horizontal section on the line 5—5 of Fig. 4 through the air compression cylinders, showing the primary air intake port therein.
Figure 6:
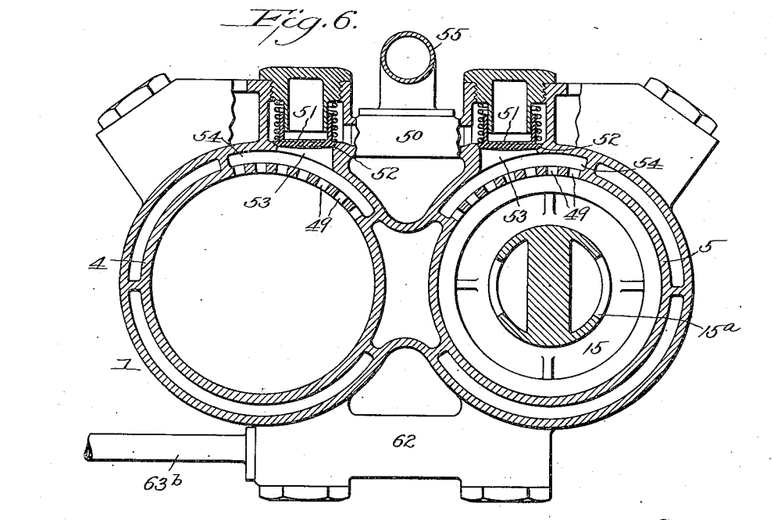
Fig. 6 is a similar view on the line 6—6 of Fig. 4 showing the primary air discharge ports for the discharge of air under moderate pressure.

Referring first to the ports in the air compression cylinders, it will be observed that as shown more particularly in Figs. 1, 4 and 5, each air compression cylinder is provided on opposite sides with main intake air ports 48 which extend through the cylinder wall near the inner end of the cylinder and which communicate directly with the outside atmosphere, which ports are uncovered in the retreat or inward stroke of the air piston as shown to the left in Fig. 4, and which are covered by the piston in its advance or compression stroke. Beyond these ports and at a point farther i nthe advance of the piston as shown in Figs. 4 and 6, the cylinder is provided at one side with a series of primary air discharge ports 49 for the discharge of air at low pressure, say ten pounds, which air is employed for facilitating the introduction of the fuel and for scavenging the power cylinders. These ports extend through the wall of the cylinder and communicate with a by-pass manifold 50 through an outwardly opening discharge valve 51 closing against a valve seat 52 surrounding an opening 53 forming a communication between the manifold and a chamber 54 inclosing the ports 49. It will be understood that there is a by-pass manifold for each pair of air compression cylinders, and that there is a valve 51 controlling the communication of each cylinder with its associated manifold, and pipes 55 and 56 extend from the two manifolds inwardly toward each other and connect at their inner ends by means of a distributing pipe 56ª with two annular chambers 57 which surround the respective power cylinders at their lower ends and which communicate with the interior of said cylinders through scavenging ports 58 extending through the walls of the power cylinders as will be more particularly described hereinafter.

Figure 10:
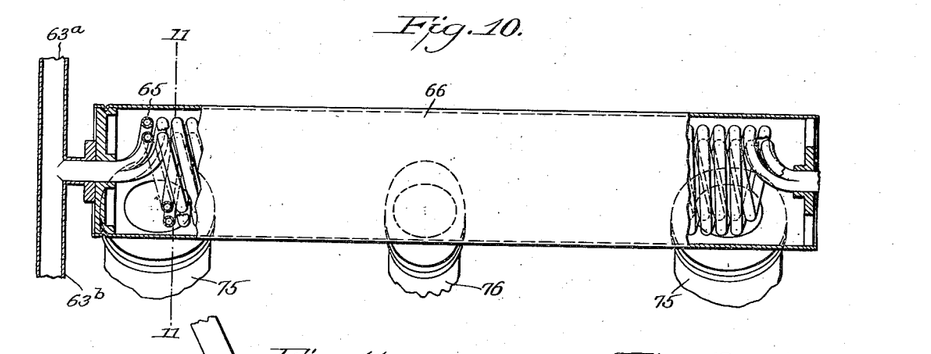
Fig. 10 is a plan view partly in section of the exhaust manifold and the air heating coil therein.
Figure 11:
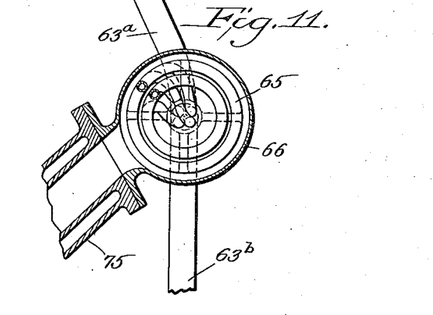
Fig. 11 is a cross section through the same on the line 11—11 of Fig. 10.
Figure 12:
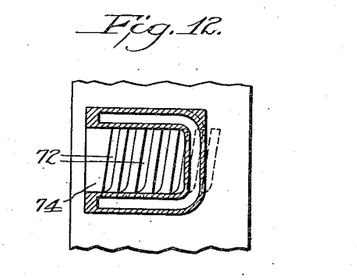
Fig. 12 is a cross section on the line 12—12 of Fig. 9.

Near the outer end of each air cylinder at one side is a series of terminal air discharge ports 59 (Figs. 1, 4 and 7) which discharge into a chamber 60 from which a passage 61 leads to a terminal manifold 62, the said passage 61 being provided with a valve seat 63 on which seats an outwardly opening check valve 64, it being understood that the corresponding terminal ports in the other air cylinder communicate with this manifold through a corresponding passage 61 controlled by a cylinder valve 64. These ports are for the discharge of the air under the full pressure produced by the several air pistons, and from the ports of the several air cylinders, the air may be delivered to a storage tank or reservoir, or its place of use, for instance for the operation of an air expansion engine for propelling an automobile. In the present instance I deliver this air from the two manifolds at the opposite ends of the engine respectively, through two pipes 63ª and 63ᵇ, the former being connected with the upper manifold and extending downwardly to a common pipe 64 and the latter being connected with the lower manifold and extending upwardly to and connecting with said common pipe, which latter communicates with a horizontal heating coil 65 inclosed in an exhaust manifold 66, (Figs. 1 and 10) by which means the air is highly heated and its efficiency for power purposes thus increased.

Figure 7:
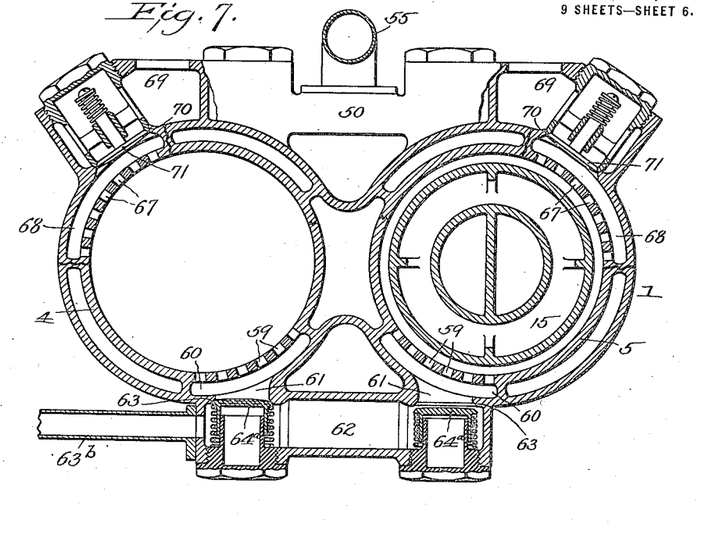
Fig. 7 is a similar view on the line 7—7 of Fig. 4 showing the secondary air intake ports.
Figure 8:
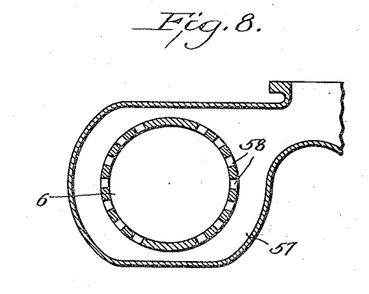
Fig. 8 is a horizontal section through one of the power cylinders on the line 8—8 of Fig. 4 showing the ports for admitting scavenging air to said cylinders.

Intermediate the low pressure discharge ports 49 and the terminal discharge ports 59, the air cylinder is provided at one side as shown in Fig. 7 with air inlet ports 67 extending through the walls thereof and communicating with a chamber 68 provided with an opening 69 leading to the atmosphere, said opening being formed with a valve seat 70 on which seats an inwardly opening check valve 71. The purpose of these ports in the several cylinders is to admit air to the cylinders on the beginning of the return stroke of the pistons in order to prevent the creation of a vacuum therein.

Figure 9:
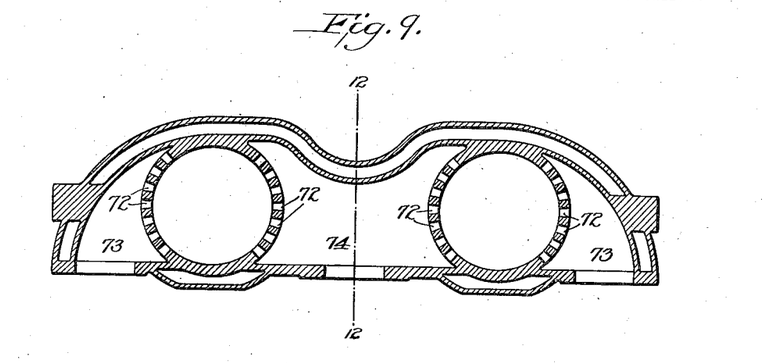
Fig. 9 is a horizontal section through the power cylinders on the line 9—9 of Fig. 4 showing the exhaust ports in said cylinders.

The power cylinders have two sets of ports, one, the before mentioned scavenging ports 58 at the lower ends of the cylinders for the admission of scavenging air under reduced pressure, and the other, exhaust ports 72 arranged in two series on opposite sides of the cylinders at their upper ends as best shown in Figs. 4 and 9. The exhaust ports at the outer sides of the two cylinders are closed by outer chambers 73, while the ports on the adjacent sides of the cylinders are inclosed by a central chamber 74, which several chambers are formed in the engine housing or casing and communicate by means of two outer pipes 75 and an intermediate pipe 76, with the side of the exhaust manifold 66 before alluded to. As a result of this arrangement the highly heated exhaust gases will enter the exhaust manifold at a number of points in its length, and circulating around the heating coil therein will heat the air passing through said coil.

As the opposing power pistons of a set move outwardly away from each other in the power stroke, the upper pistons will uncover the exhaust ports and the lower pistons will uncover the scavenging ports, and by reason of the fact that the exhaust ports terminate nearer the center of the cylinder than the scavenging ports, as shown in Fig. 4, the exhaust ports will be opened first and establishing communication with the outside atmosphere will permit the escape of the products of combustion, and operating closely thereafter the scavenging ports will be opened and admitting the scavenging air under low pressure, this latter will, due to the fact that the pressure in the cylinder has been reduced to atmospheric pressure by the previous opening of the exhaust ports, sweep upwardly through the cylinders and through the exhaust ports and thereby clean out the remaining products of combustion.

The operation of the mechanism so far described is as follows:

The pistons of the two sets being in the position shown in Fig. 4, with those of the left hand set at the limit of their inward stroke, and those of the other set at the limit of their outward stroke, the primary air intake port 48 in the air cylinders 2 and 4 is uncovered and the two cylinders are filled with air. In the air cylinders of the other set, their pistons have passed beyond the terminal air discharge ports 59 and have entrapped the air in the ends of the cylinder, which when the pistons reached the limit of their outer stroke, acted to compress said entrapped air and thereby assisted in cushioning the power cylinders 10 and 12 at the limit of their inward stroke. In this position of the parts the ignited fuel fired by the compression of the power pistons 10 and 12 enters the power cylinder 6 between the two pistons through the fuel insertion port 17 in the manner to be more particularly described hereinafter, and the fuel burning, expands and forces the pistons outwardly from each other, thereby correspondingly moving the air pistons 9 and 11 outwardly. As the air pistons move out, they gradually cover and close the primary air intake ports 48 and when these ports are completely covered the pistons begin to compress air which escapes at a comparatively low pressure into the by-pass manifolds 50, whence it passes by pipes 55 and 56 to the annular chambers 57 inclosing the scavenging ports 58 in the power cylinders. At this stage of the cycle, the scavenging ports are closed in both power cylinders by the lower power pistons, and the air under this low pressure, say 10 lbs., is accumulated in the chambers 57 ready to rush into the scavenging ports when the latter are uncovered. At the moment that the air pistons begin to cover the primary air discharge ports 49, the upper power piston uncovers the exhaust ports 72 and the exhaust flows into the exhaust manifold before described and thence to the atmosphere, thereby reducing the pressure in the power cylinder to atmospheric pressure. On the continued movement of the air pistons, and at the moment that they completely cover and close the primary air discharge ports 49, the lower power piston opens the scavenging ports, whereupon the air under low pressure in the annular chamber 57 flows into the lower end of the power cylinder, and sweeping through the same escapes through the exhaust ports, thereby scavenging the cylinder and supplying fresh air for compression for the next fuel insertion. The power pistons continue in their outward movements, thereby fully opening the scavenging and exhaust ports, in which action, the air pistons continue their advance and compress the air to its full pressure, which escapes through the ports 59 into the terminal manifold 62 and thence flows by pipes 63$^a$ and 63$^b$ to the heating coils 65 in the exhaust manifold. The discharge of air under full pressure continues in this way until the air pistons have fully covered the ports 59 and prevented further escape of the air from the air cylinders. The air remaining in the clearance volumes B in the cylinders is therefore trapped by the pistons, and as the latter advance in the final stage of their outward stroke, this trapped air is compressed and acts as a cushion in assisting to bring the piston to rest.

In the outward power stroke of the power pistons above described, the rocker plates 19 were rocked to the left by the links 23 and 24, which action due to the connection of these rocker plates with the other rocker plates 20, caused the latter to be rocked in the same direction, and through the medium of the links connecting the plates 20 with the power pistons 14 and 16, the latter were moved inwardly from the position shown in Fig. 4. In this inward movement of the power piston the exhaust ports and scavenging ports were covered by the pistons and the primary air intake ports 48 in the two air cylinders 3 and 5 were opened by the air pistons in order to admit air to the cylinders for the next compression, the two power pistons compressing the air between them to the high pressure necessary to ignite the fuel. The foregoing operations are repeated, the two sets of power and air compression pistons moving outwardly and inwardly alternately and each set balancing and equalizing the movements of the other set. As the air pistons make their inward or return stroke as shown to the right in Fig. 4, they uncover the secondary air intake ports 67 which admits air from the atmosphere to the cylinders and thus prevents formation of vacuums in the cylinders on the return strokes of the pistons.

In thus utilizing the compression as a cushion for the reciprocating masses, it will be understood that this compression pressure in the Diesel cycle steps up with the increased reciprocation of the combined unit on account of the increase due to inertia, thereby increasing the rate of flame propagation within the shorter time required for burning the fuel at the higher rate of reciprocation. It will be further noted that the Diesel cycle is of particular effectiveness in co-action with the cushioning action in controlling the reciprocating masses, because of the Diesel non-explosive compression peak characteristic, giving a compression up to the maximum point, adiabatic in character and then remaining practically constant during the burning of the fuel and until the pressure falls during expansion.

Figure 13:
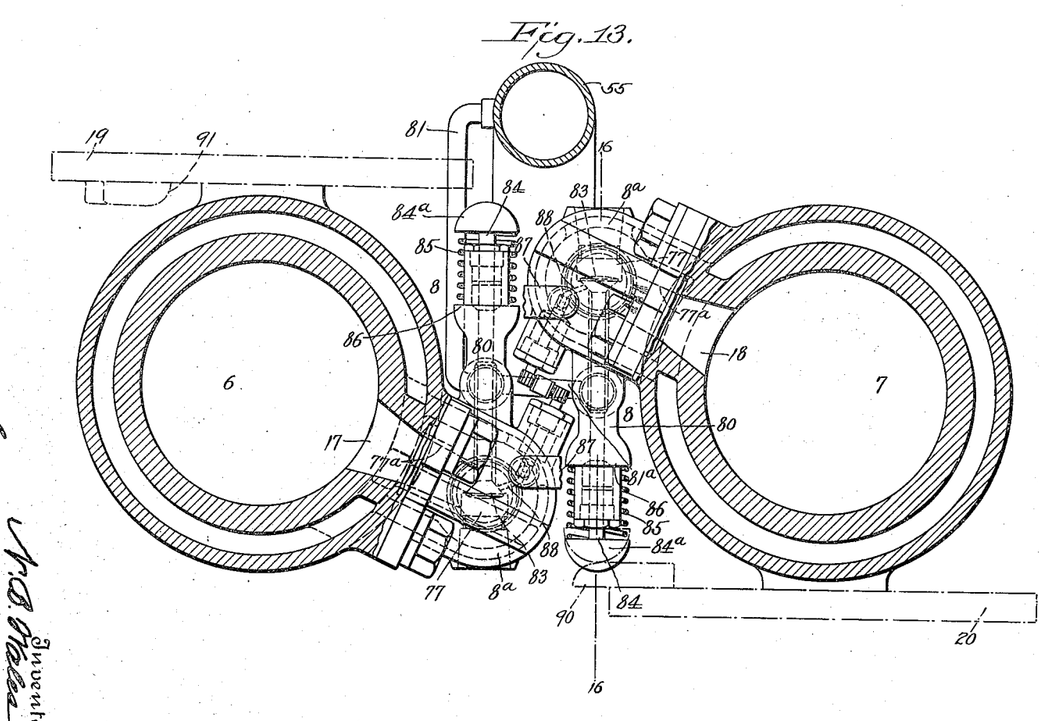
Fig. 13 is a horizontal sectional elevation on an enlarged scale on the line 13—13 of Fig. 4 showing the relative arrangement of the two sets of cylinders and the fuel feeding mechanisms therefor.
Figure 14:
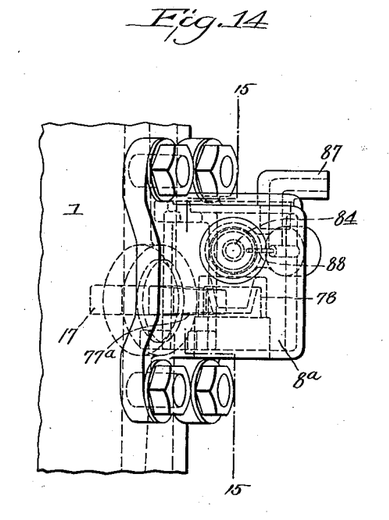
Fig. 14 is a side elevation on an enlarged scale of the housing for one of the fuel injection mechanisms.
Figure 15:
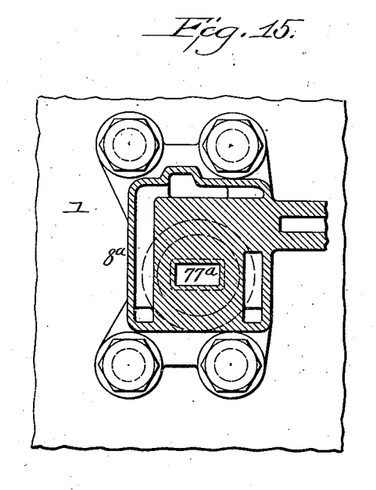
Fig. 15 is a vertical section on the line 15—15 of Fig. 14.
Figures 16, 19:
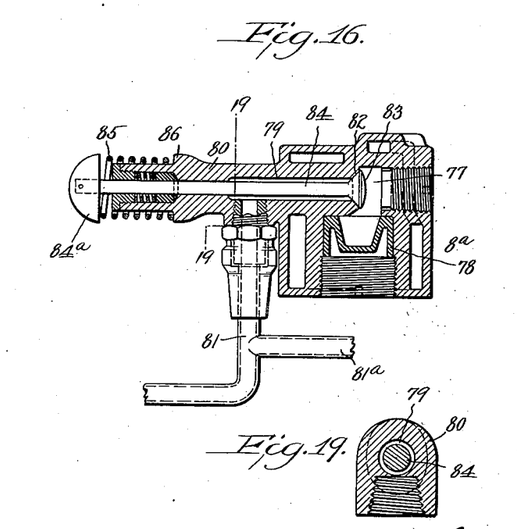
Fig. 16 is a vertical section on the line 16—16 of Fig. 13.
Fig. 19 is a vertical section on the line 19—19 of Fig. 16.
Figure 17:
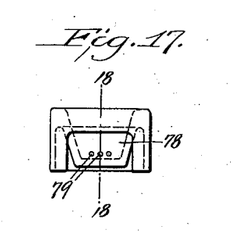
Fig. 17 is an elevation of one of the fuel cups.
Figure 18:
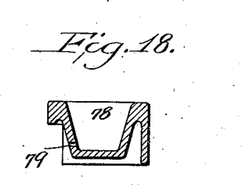
Fig. 18 is a vertical section through the same on the line 18—18 of Fig. 17.

The operative parts of the two fuel injection mechanisms 8—8 before alluded to are sustained by housings 8ª which are bolted to the exterior of the power cylinders at the inner sides, and which project inwardly at an inclination with respect to a vertical plane passing centrally through the two cylinders, the said housings overlapping each other in the central space between the cylinders, this disposition of the casings producing a compact arrangement and avoiding the projection of any parts beyond the general contour of the cylinder structure. Each of the housings 8ª is formed with a chamber 77, which chambers in the two housings communicate by means of passages 77ª with the fuel injection openings 17 and 18 in the power cylinders. A fuel cup 78 is situated in each chamber, which cup is provided in its side wall with holes 79 discharging into the passage 77ª. An air passage 79 communicates at its inner end with the chamber 77 at a point over the fuel cup and extends outwardly through an extension or neck 80 of the casing 8ª and communicates at its outer end with a pipe 81, which pipe extends upwardly and connects with the pipe 55 leading downwardly from the by-pass manifold 50 before alluded to, whereby the air under low pressure from the by-pass manifold will enter the air passage 79. This low pressure air is admitted to the air passage 79 of the other fuel injection housing by means of a pipe 81ª which connects the air pipes 81 of the two housings. Where the air passage 79 communicates at its inner end with the chamber 77, it is provided with a valve seat 82 against which closes an inwardly acting valve 83 fixed to the inner end of a valve stem 84 which extends outwardly through the air passage 79 and through the outer end of the neck 80, a head 84ª being applied to the outer exposed end of the stem for operating it. A spiral spring 85 surrounds the end of the neck and bears at its inner end against a shoulder 86 on the neck and at its outer end against the head and tends to hold the valve yieldingly on its seat. Extending into each of the housings 8ª is a fuel supply pipe 87 which receives fuel, in the present instance oil, from a suitable source of supply, the inner end of which pipe communicates with a restricted opening 88 in the housing leading through the valve seat in position to be closed by the valve 83 when the latter is in closed position on its seat, the arrangement being such that when the valve is opened in the manner to be more particularly described hereinafter, a supply of oil will enter the chamber 77 in the path of the stream of air entering through the air passage 79, and the mixed oil and air will enter the chamber and the oil will accumulate on the bottom of the cup. As shown more particularly in Fig. 13 the two necks 80 extend parallel with each other side by side respectively in opposite directions from their casings, so that the operating head of one of the valves will be exposed at one side of the cylinder structure, and the operating head of the other valve will be disposed at the opposite side of said structure. The valves are operated on the two sides, respectively by the rocking plates 19 and 20 in such manner that the valves will be opened at the moment that the power pistons reach the limit of their outward stroke. This action of the rocker plates is effected by means of a cam arm 90 on the rocker plate 20 on one side of the cylinder structure and a cam arm 91 on the rocker plate 19 on the other side of the cylinder structure. These cams are so formed that when the rocker plate 20 is rocked clockwise to the position shown to the right in Fig. 1, in which position the power pistons on that side are at the limit of their outward stroke, the cam 90 engaging the head 84ª on the valve stem, the latter will be pushed inwardly and the valve opened to admit the fuel to the cup; and when the rocker plate 19 carrying arm 91 is rocked when the other power pistons move outwardly and reach the limit of their outward stroke, the cam acting on the head of the other valve stem, its valve will be pushed inwardly and opened to admit the fuel to the fuel cup for that set of pistons. After the injection of the fuel, the opposing pistons move toward each other and compressing the air between them to a high pressure, which pressure communicates with the fuel cup, sufficient heat is generated to ignite the fuel, which expands in the fuel cup and creates a greater pressure than that created by the pistons, which greater pressure expels the fuel from the cup through the openings therein, into the cylinder between the pistons, and burning therein the gases expand and furnish the force for the outward power stroke of the pistons, these actions taking place alternately in the two power cylinders, as will be understood.

It will be noted that due to the floating character of the entire reciprocating masses with their variable stroke characteristic, an increase in the rise of reciprocations produces an increase of the compression pressures in the power cylinders, because these compression pressures are directly produced by the cushioning of the reciprocating masses, and with their greater rate of reciprocations, a rise of pressure necessarily follows in the cushioning of these masses.

In accordance with the improved method involved in the operation of the mechanism, I so position the terminal air discharge ports in the air cylinders with respect to the cylinder heads, that the maximum discharge of air pressure will be automatically limited without stalling the compressor, and without the provision of other means for governing the operation of the same. This is due to the fact that as the air pressure rises in the storage tank or reservoir connected to the terminal air discharge ports, if such tank is employed, the air pressure in the clearance volumes of the air compression cylinders increases with this increase of pressure. These clearance volume pressures being used expansively as the pistons recede from their extreme cushioning positions, are directly reflected in a higher compression pressure in the power cylinders, such that the terminal compression pressures in the power cylinders progressively rise with the above-mentioned increase of pressure in the clearance volumes of the air compression cylinders. The mean effective expansion pressures rise progressively with the mean effective cushioning pressures. In this manner the air compression discharge pressure will rise to a critical point, determined by the volume ratio of compression in the air compression cylinders at the instant that the terminal air discharge ports are cut off by the piston passing thereover, and from that time on in the operation of the compressor, no discharge of air will be effected by it because the air compression pressure in the tank or reservoir will be equal to the pressure produced by the ratio of the compression as determined by the positioning of the terminal air discharge ports. The compressor, however, will continue in its operation without stalling or injury.

In the foregoing description and accompanying drawings I have set forth my invention in the particular detailed form which I prefer to adopt for best realizing the results to be attained, but it will be understood that these details may be variously changed and modified without departing from the limits of my invention; and further it will be understood that the invention is not limited to any particular form or construction of the parts, except in so far as such limitations are specified in the claims.

An electric self starter mechanism C may be employed, which as shown in Fig. 1 is pivoted by means of a link $c$ to an arm $c'$ projecting from the shaft 41 before alluded to.

Having thus described my invention, what I claim is:

1. In a mechanism of the type described, the combination of a casing having oppositely positioned air compression cylinders, and an intermediate open-ended power cylinder, two variable-stroke reciprocating piston structures entering respectively the opposite ends of the power cylinder and the air compression cylinders, and means connecting said pistons to synchronize their reciprocatory movements in the cylinders.

2. In a mechanism of the type described, the combination of a casing having oppositely positioned air compression cylinders, and an intermediate open-ended power cylinder, two variable-stroke reciprocatory piston structures entering respectively the opposite ends of the power cylinder and the air compression cylinders, and connecting means between the piston structures to cause them to reciprocate in unison, said connecting means being sustained by the casing and being connected respectively with the two piston structures.

3. In a mechanism of the type described, the combination of a casing having oppositely positioned air compression cylinders, and an intermediate open-ended power cylinder, two variable-stroke reciprocating piston structures entering respectively the opposite ends of the power cylinder and the air compression cylinders, and a linkage connecting the piston structures to cause them to reciprocate in unison, said linkage being pivoted respectively to the casing and to the piston structures.

4. In a mechanism of the type described, the combination of a casing having two pairs of oppositely positioned air compression cylinders, and an open-ended power cylinder between the air compression cylinders of each pair, two pairs of opposing variable-stroke reciprocating piston structures, each pair entering, respectively the opposite ends of a power cylinder and the associated air compression cylinders, means connecting the opposing piston structures of each pair to cause them to reciprocate in synchronism, and a second means connecting the connecting means of one pair of piston structures with the connecting means of the other pair of piston structures to cause the two pairs to move synchronously but respectively in opposite directions.

5. In a mechanism of the type described, the combination of a casing provided with two pairs of air compression cylinders and a power chamber intermediate of and common to the air compression cylinders of each pair, two sets of variable-stroke power pistons, one set reciprocating in each of the common power chambers, an air compression piston connected with each power piston and reciprocating in the respective air compression cylinders, and means connecting the two sets of pistons to cause one set to move in synchronism with the other set but in opposite directions thereto.

6. In a mechanism of the type described, the combination of a casing formed with cylinders, a plurality of variable-stroke pistons reciprocating in said cylinders, and means connecting said pistons to cause them to reciprocate in unison with each other.

7. In a mechanism of the type described, the combination of a casing provided with two sets of cylinders, two sets of variable-stroke pistons reciprocating in said cylinders, and means connecting one set of pistons with the other set to cause the pistons of one set to reciprocate in unison with the pistons of the other set, but in opposite directions thereto.

8. In a mechanism of the type described, the combination of a casing provided with two sets of cylinders, two sets of variable-stroke power pistons reciprocating in said cylinders, each set comprising two piston structures movable toward each other to compress the air between them to ignite the charge, and movable away from each other in the power stroke, and means whereby said compression by the pistons of one set will cushion the power stroke of the pistons of the other set, and vice versa.

9. In a mechanism of the type described, the combination of a casing provided with two sets of air compression cylinders, and an open-ended power cylinder between the air compression cylinders of each set, a set of opposing variable-stroke power pistons reciprocating in each power cylinder, an air compression piston connected with each power piston and reiprocating in the respective air compression cylinders, and connections between the two sets of pistons to cause those of one set to reciprocate in unison with those of the other set but in opposite directions thereto, the areas of the power pistons being so proportioned with relation to the areas of the air compression pistons, that the reciprocating masses will be equally cushioned with respect to the termination of the piston strokes.

10. In a mechanism of the type described, the combination of a casing provided with two power cylinders, a variable-stroke power piston reciprocating in each cylinder, said pistons being movable in one direction on the compression stroke to produce ignition thereby, and being movable in the opposite direction on the power stroke, and means whereby the power stroke of one piston in one direction will move the other piston in the other direction on the compression stroke.

11. In a mechanism of the type described, the combination of a casing provided with two power cylinders, opposing variable-stroke power pistons in each cylinder movable toward each other on the compression stroke to ignite the charge, and movable away from each other on the power stroke, and means whereby the outward power stroke of one set of pistons will move the pistons of the other set inwardly on the compression stroke.

12. In a mechanism of the type described, the combination of a casing provided with a power cylinder, opposing power pistons reciprocating therein, and movable toward each other on the compression stroke and movable away from each other on the power stroke, a rocking plate mounted on the casing, and links pivoted at their inner ends to the rocking plate respectively on opposite sides of its axis, and pivoted at their outer ends to the respective pistons.

13. In a mechanism of the type described, the combination of a casing provided with two power cylinders, opposing power pistons in each cylinder movable toward each other on the compression stroke and movable away from each other on the power stroke, two rocking plates mounted on the casing, a pair of links for each rocking plate pivoted at their inner ends to their plate respectively on opposite sides of the axis of the same, and pivoted at their outer ends respectively to their associated pistons, and links pivoted respectively to the two plates to cause them to move in unison with the pistons of one set moving in a direction opposite the pistons of the other set.

14. In a mechanism of the type described, the combination of a casing provided on opposite ends with air compression cylinders open at their inner ends and provided also with an intermediate alined open-ended power cylinder of a diameter less than the diameter of the air cylinders, the outer ends of said power cylinder extending into the open inner ends of the air cylinders, thereby leaving an annular space between them, opposing power pistons reciprocating in the power cylinder; air pistons connected with the power pistons and reciprocating in the respective air cylinders, and linkages connecting the power pistons and adapted in the movements of the pistons to extend into said annular spaces.

15. In a mechanism of the type described, the combination of a casing provided with two cylinders disposed side by side and spaced from each other, pistons in said cylinders, fuel injection housings applied to the sides of the cylinders and extending toward each other in the space between them and communicating with the interior of the cylinders, and fuel injection mechanisms in said housings.

16. In a mechanism of the type described, the combination of a casing provided with two cylinders disposed side by side and spaced from each other, pistons in said cylinders, fuel injection housings applied to the adjacent sides of the cylinders and projecting side by side into the space between them, fuel injection mechanisms in said housings, including valves to admit the fuel charge, and stems on said valves extending in opposite directions from the housings side by side.

17. In a mechanism of the type described, the combination of a casing provided with a power cylinder, opposing power pistons reciprocating therein, said cylinder being provided with an opening for the introduction of the fuel between the pistons, means connecting the pistons to cause them to reciprocate in unison, and a fuel injection mechanism sustained by the cylinder for supplying the fuel charge to said opening, said mechanism being operated by the means connecting the two pistons.

18. In a mechanism of the type described, the combination of a casing provided with a power cylinder, opposing power pistons reciprocating therein, said cylinder being provided with an opening for the introduction of the fuel between the pistons, a rocker plate mounted on the casing, links connecting the rocker plate with the respective pistons to cause said pistons to move to and from each other in unison, a fuel injection mechanism sustained by the casing and adapted to supply the fuel charge through the opening in the cylinder, said mechanism including a controlling valve and an operating stem terminating adjacent the rocker plate, and a cam on said rocker plate adapted, when the plate is rocked with the pistons at the limit of their power stroke, to engage the stem and open the valve.

19. In a mechanism of the type described, the combination of a casing provided with a pair of open-ended power cylinders and with air compression cylinders associated with the power cylinders, pistons in the respective cylinders, means for moving the pistons of one pair away from each other when the pistons of the other pair move toward each other, and vice versa, said pistons being cushioned and brought to rest by the compression produced between the approaching power pistons of one pair coincident with the terminal compression produced by air pistons of the other pair.

20. The method of automatically and predeterminately limiting the pressure of the air compressed in an air compressor without stalling or stopping said air compressor, which consists in expansively utilizing the air pressure generated in the clearance volumes of the air compression cylinders to directly increase the compression in the power cylinders of said air compresser progressively as said air compression rises, such that the mean effective expansion pressures in said power cylinders progressively increase with the increase of mean effective compression pressure in the air compression cylinders up to the compression ratio of the air compression cylinders.

21. In an internal combustion engine, a casing having combustion chambers, a plurality of pairs of oppositely moving and variable stroke floating pistons, each pair of said pistons entering from opposite sides of their respective chambers, means for supplying a combustible mixture to said chambers, means for connecting one pair of pistons to the next adjacent pair so that one chamber will be brought under compression while the next adjacent chamber is firing, each of said pistons by reason of its variable stroke acting to compress the explosive mixture in the respective combustion chambers at a substantially even pressure regardless of the volume of combustible mixture supplied.

In testimony whereof, I have affixed my signature hereto.

NATHANIEL B. WALES.